Jan. 9, 1934.  M. L. CLARK  1,942,508
MEANS OF PROJECTING GRADUATIONS AND CHARACTERS OF MEASURING DEVICES
Filed Feb. 6, 1930
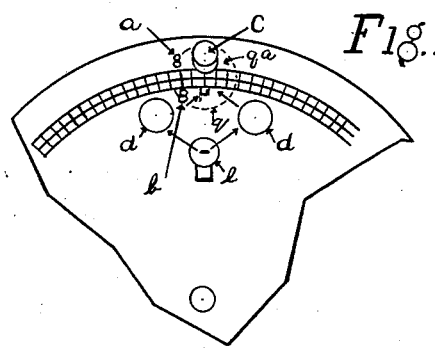
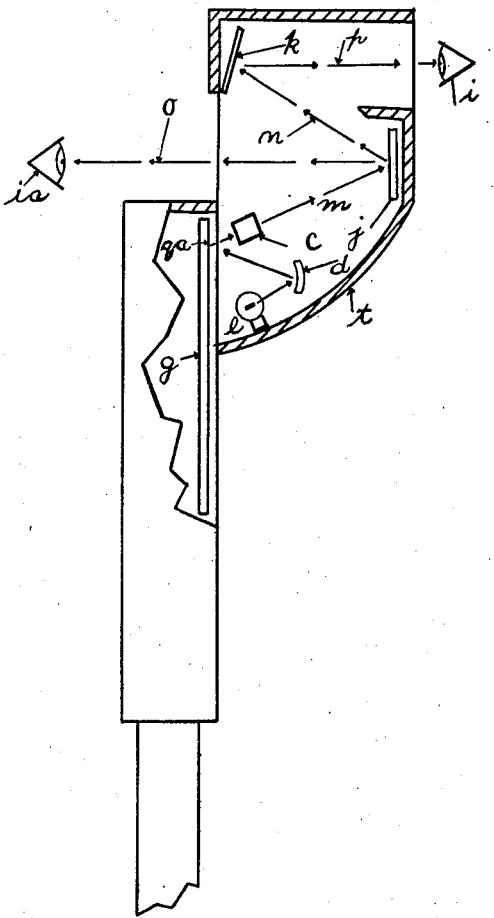
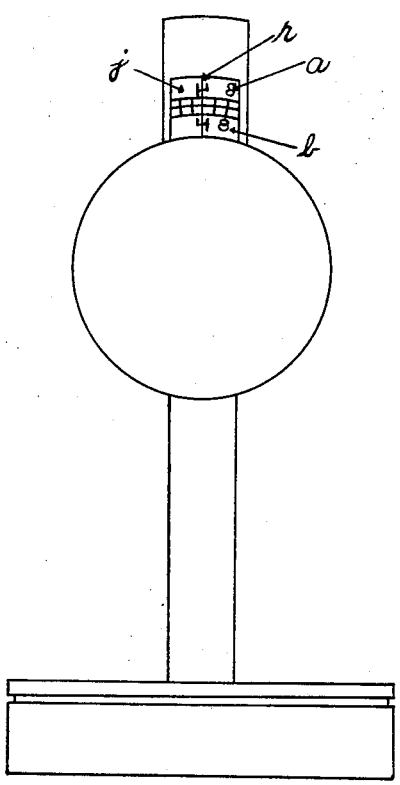
Mary L. Clark
INVENTOR Patented Jan. 9, 1934

1,942,508

UNITED STATES PATENT OFFICE 1,942,508

MEANS OF PROJECTING GRADUATIONS AND CHARACTERS OF MEASURING DEVICES

Mary L. Clark, Newark, N. J.

Application February 6, 1930. Serial No. 426,338

2 Claims. (Cl. 88—24)

My invention relates to improvement in projecting and illuminating the indicating graduations and characters of measuring devices and the objects of my invention, are first, to provide a means of projecting indicating graduations and characters magnified a number of times onto an opaque screen by means of the principle of opaque projection; second, to intensify the illumination furnished by an electric lighting bulb on the visible indicating graduations as they appear at the recording point, by means of one or more mirrors preferably of the concave condensing type; third, to furnish a reflection of projection on screen to a person located in a position other than that occupied by the operator observer.

I attain these objects by the mechanism illustrated in the accompanying drawing in which I use a graduated dial as the indicating means for indicating the results of the measuring device and to explain the various functions of the different parts of my invention in relation to the indicating graduations and characters, which, in some machines may be in a straight row or marked on the outside of a cylinder or otherwise, Figure I is a vertical front view of a weighing scale of the dial type with the platform towards the weighman operator; Figure II is a side view of the housing with cut-out section showing edge view of dial and its relative position to opaque projecting mechanism; Figure III is a back view of dial showing relative position of projecting lens, two intensifying mirrors and electric illuminating bulb and indicating graduations and illuminated area.

Similar characters refer to similar parts throughout the several views.

The projector housing $t$, has properly located standards and other means not shown to support the various parts, a standard electric illuminating bulb $e$, the filament of which when illuminated is reflected onto area $qa$, shown within dotted circle $q$, of graduated face of dial $g$, by means of one or more mirrors $d$, preferably of the concave condensing type, through which area $qa$, indicating graduations as $a$ and $b$, on dial $g$, pass, as measuring device functions.

A projecting magnifying lens $c$, trained and focused on area $qa$, projects reflection of graduations as $a$ and $b$, in enlarged form through space indicated by line $m$, onto screen $j$, preferably made of aluminum and satin finished on its first surface and marked on its recording face with indicator line $r$, which reflection is observed by operator's eye $ia$, along line of the observation $o$.

A mirror preferably of the first surface type $k$, is placed in approximately the relative position as shown in drawing Figure II sufficiently out of line of vision $o$, so that it will not obstruct the view of screen $j$, by eye $ia$, but at a proper angle with screen $j$, to permit the projected reflection on screen $j$, to be observed by eye $i$, along line of observation $p$, and line of reflection $n$.

The arrangement and location of various parts may be altered somewhat to adapt the device to the particular design of the machine to which the device is attached to and to meet conditions under which the device may be used without detracting from the novel features of my invention and I do not wish to be limited to the specific location and arrangement of parts as shown in this specification and drawing.

$a$ and $b$ show two lines of characters one of which is reversed to permit observer $ia$, to read direct from screen $j$, the projected reflection straight of reversed characters and to permit $i$, to read the other character in mirror $k$, corrected to read straight from reversed projection on screen $j$.

I claim:

1. In combination with a measuring device having indicating graduations, an electric illuminating bulb, one or more mirrors adapted to reflect the rays of light from the filament of illuminated electric bulb onto indicating graduations of measuring device marked on the first surface of an opaque material, a projecting lens located at a focused point between the indicating graduations of the measuring device and the first surface of an opaque screen adapted to receive the projected illuminated indicating graduations, which first surface of opaque screen is within the observation of the operator of the measuring device substantially as shown and described.

2. An encased opaque projecting device adaptable to project graduations of a measuring machine, comprising a casing having openings therein, an electric illuminating bulb, one or more mirrors adapted to reflect the rays of light from the filament of the said electric illuminating bulb through an opening in the said casing onto indicating graduations of the said measuring machine marked on an opaque material, a projecting lens located between the said indicating graduations of the said measuring machine and an opaque screen located within and on the opposite side of said case from said indicating graduations and adapted to receive the projected image of said illuminated indicating graduations, said illuminating bulb mirrors located below said opaque screen and between said opaque screen and said illuminating bulb to shield said opaque screen from illumination from said illuminating bulb, which opaque screen is within the scope of an observation mirror located above the said screen and at the opposite side of casing and visible to an observer other than the operator of the said measuring machine through an opening in said case opposite to said mirror and above said screen, but not in a location that will interfere with a clear unobstructed view of the said opaque screen by the operator of the said measuring machine through an opening in said case above said illuminated graduations in alignment with and opposite said screen.

MARY L. CLARK.